United States Patent
Day et al.

(10) Patent No.: US 7,290,107 B2
(45) Date of Patent: *Oct. 30, 2007

(54) DIRECT DEPOSIT USING LOCKING CACHE

(75) Inventors: Michael Norman Day, Round Rock, TX (US); Charles Johns, Austin, TX (US); Thuong Truong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 410 days.

This patent is subject to a terminal disclaimer.

(21) Appl. No.: 10/976,263

(22) Filed: Oct. 28, 2004

(65) Prior Publication Data

US 2006/0095669 A1    May 4, 2006

(51) Int. Cl.
*G06F 12/00* (2006.01)
(52) U.S. Cl. .................. 711/163; 711/153; 711/154
(58) Field of Classification Search ................ 711/128, 711/136, 141, 163; 712/223
See application file for complete search history.

(56) References Cited

U.S. PATENT DOCUMENTS

| | | | |
|---|---|---|---|
| 2001/0001873 A1* | 5/2001 | Wickeraad et al. | 711/136 |
| 2002/0046326 A1* | 4/2002 | Devereux | 711/128 |
| 2002/0046334 A1* | 4/2002 | Wah | 712/223 |
| 2002/0065992 A1* | 5/2002 | Chauvel et al. | 711/141 |
| 2006/0095668 A1 | 5/2006 | Day et al. | |

* cited by examiner

*Primary Examiner*—Pierre Bataille
*Assistant Examiner*—Paul Schlie
(74) *Attorney, Agent, or Firm*—Stephen R. Tkacs; Stephen J. Walder, Jr.; D'Ann N. Rifai

(57) ABSTRACT

The present invention provides a method of storing data transferred from an I/O device, a network, or a disk into a portion of a cache or other fast memory, without also writing it to main memory. Further, the data is "locked" into the cache or other fast memory until it is loaded for use. Data remains in the locking cache until it is specifically overwritten under software control. In an embodiment of the invention, a processor can write data to the cache or other fast memory without also writing it to main memory. The portion of the cache or other fast memory can be used as additional system memory.

17 Claims, 5 Drawing Sheets

DIRECT DEPOSIT USING LOCKING CACHE

RELATED APPLICATIONS

This application relates to a co-pending U.S. patent application entitled "Method for Processor to Use Locking Cache as Part of System Memory" in the names of Michael Norman Day, Charles Ray Johns, and Thuong Quang Truong, filed concurrently herewith.

TECHNICAL FIELD

The present invention relates generally to memory management and, more particularly, to the use of caches.

BACKGROUND

The latency (time spent waiting) for memory access, both to write to memory and to read from memory, is often a problem for software programs. In current computers, processor cycles are much shorter than the time for memory access. Further, the problem is becoming more severe. Processor speed is increasing exponentially, and memory access is increasing only gradually.

One partial remedy to the problem of memory access latency is a hierarchy of memories. The main memory has a large capacity and is slowest. On top of this are several layers of successively smaller, faster memories, or caches.

The current use of caches presents problems. A read from a cache may fail when the cache does not contain the desired data. The data must then be accessed from the slow main memory. An attempt to write data exclusively to a cache may not be permitted. The transfer of data from an I/O device, from a network, or from a disk may require may require the data to be written to main memory, either exclusively or also to local memory or to a cache. In either case, there is the latency of writing to the slower main memory. Further, there can be a latency in accessing the data. In the first case, the processor must access the data from the main memory for processing, with the resultant latency of access. In the second case, the data written to a cache may be replaced by other data before the replaced data is accessed. When this occurs, the replaced data is written to main memory. To then utilize this data, a processor must access it from main memory.

Therefore, there is a need for a method of storing data from a processor, an I/O device, a network or a disk to a cache or other fast memory without also storing it to main memory. Further, the method must guarantee that the data remains in the cache or other fast memory until it has been used.

SUMMARY OF THE INVENTION

The present invention provides a method of storing data transferred from an I/O device, a network, or a disk in a cache or other fast memory, without also writing it to main memory. Further, the data is "locked" into the cache or other fast memory until it is loaded for use. Data remains in the locking cache until it is specifically overwritten under software control.

BRIEF DESCRIPTION OF THE DRAWINGS

For a more complete understanding of the present invention and the advantages thereof, reference is now made to the following descriptions taken in conjunction with the accompanying drawing, in which.

DETAILED DESCRIPTION

In the following discussion, numerous specific details are set forth to provide a thorough understanding of the present invention. However, it will be apparent to those skilled in the art that the present invention may be practiced without such specific details. In other instances, well-known elements have been illustrated in schematic or block diagram form in order not to obscure the present invention in unnecessary detail.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
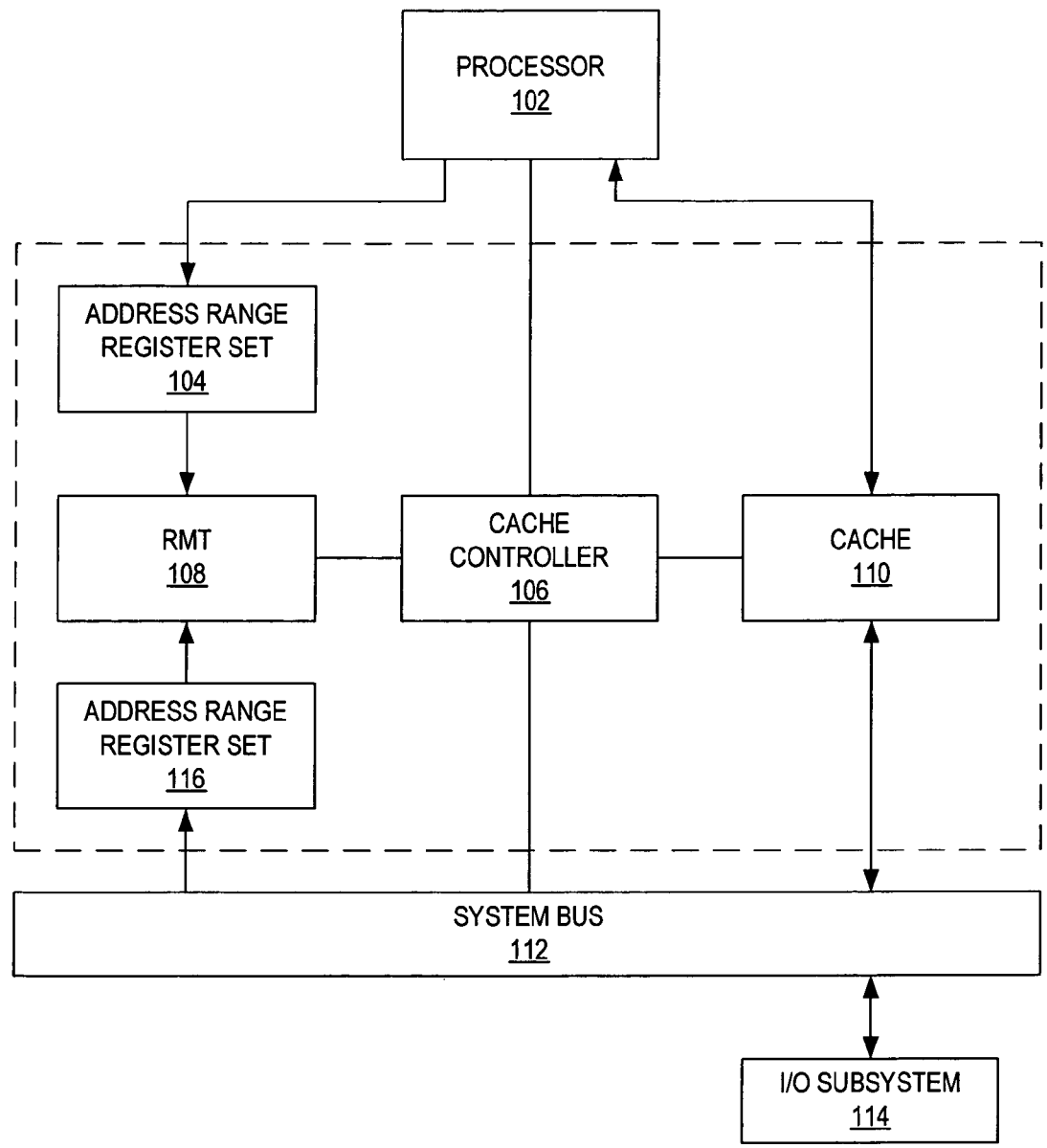
FIG. 1 shows a block diagram of a system for the storing of data transferred from an I/O subsystem in a locking cache.

FIG. 1 shows a block diagram of a system for the storing of data transferred from an I/O subsystem in a locking cache. A processor 102 is coupled to a cache 110, a cache controller 106, and a first set of address range registers 104. A replacement management table (RMT) 108 is coupled to the address range register set 104 and to the cache controller 106. The cache controller 106 and the cache 110 are coupled to a system bus 112. A second address range register set 116 is coupled to the system bus 112 and to the RMT 108. The system bus 112 is further coupled to an input/output (I/O) subsystem 114. In an embodiment of the invention, the locking cache comprises a set or sets, but not all of the sets, of a multiple set-associative cache 110. The remaining sets are used for regular cache. The separation of the cache 110 into disjoint sets for use as regular cache and locking cache prevents data written to the locking cache from being overwritten by data written to the cache in its normal use.

To both the processor 102 and the I/O subsystem 114, space in the locked cache appears as additional system memory, with an address range higher than actual main system memory address range. In an embodiment of the invention, two sets of registers, first address range register set 104 for the processor 102 and second address range register set 116 for I/O devices, determine access to the locked cache. The sets include two address range registers and a mask register. The accessing address of a load or store instruction/bus command is compared to the content of address range registers. A class_id is then provided as an index into a replacement management table (RMT) 108. The RMT 108 indicates which sets of the cache 110 are available to the load or store instruction/bus command. Transactions whose accessing address is within the specified range have access to the locking cache. Other transactions are written to other sets or ways of the cache 110.

Access to the locking cache is under software control. When the processor 102 or I/O subsystem 114 completes writing data to the locked portion of the cache 110, it can issue a signal that the data is available. Once notified, the processor 102 or I/O subsystem 114 using the data obtains the data from the locked portion of the cache 110 and issues a signal that the data has been read. The space holding the data is then available for further writing. To insure the validity of data, an area of the locked cache to which data is being written by one device is not simultaneously being read or written to by another device.

As a result of the system of FIG. 1, both the processor 102 and I/O subsystem 114 can write newly generated data to the locking cache, a fast form of memory, rather than to the much slower main memory. Further, both the processor 102 and I/O subsystem 114 can load data from the locking cache, avoiding the latency of loading it from main memory. The data is initially written to the locking cache, and is locked into the cache 110 until it is accessed.

In the locked portion of the cache, data is marked valid and modified. When an IO controller or other device accesses this data, the IO controller or other device loading the data issues a load without intent to modify request. The cache snoops the request. Given the state of the data, the cache controller 106 will intervene to fulfill the request. When data in the address range of the locked cache is loaded by the processor, the cache controller 106 returns the data to the processor as a cache hit.

When data is being stored from the system bus 112, the cache controller 106 will detect the transactions by using address range information. If the address is within the address range for accessing the locked cache, the cache controller 106 will update the cache 110 in the locked set with new data without changing the cache state. Data in this address range is stored from the processor 102 without the need of a bus transaction because of the "valid and modified" cache state.

Figure 2:
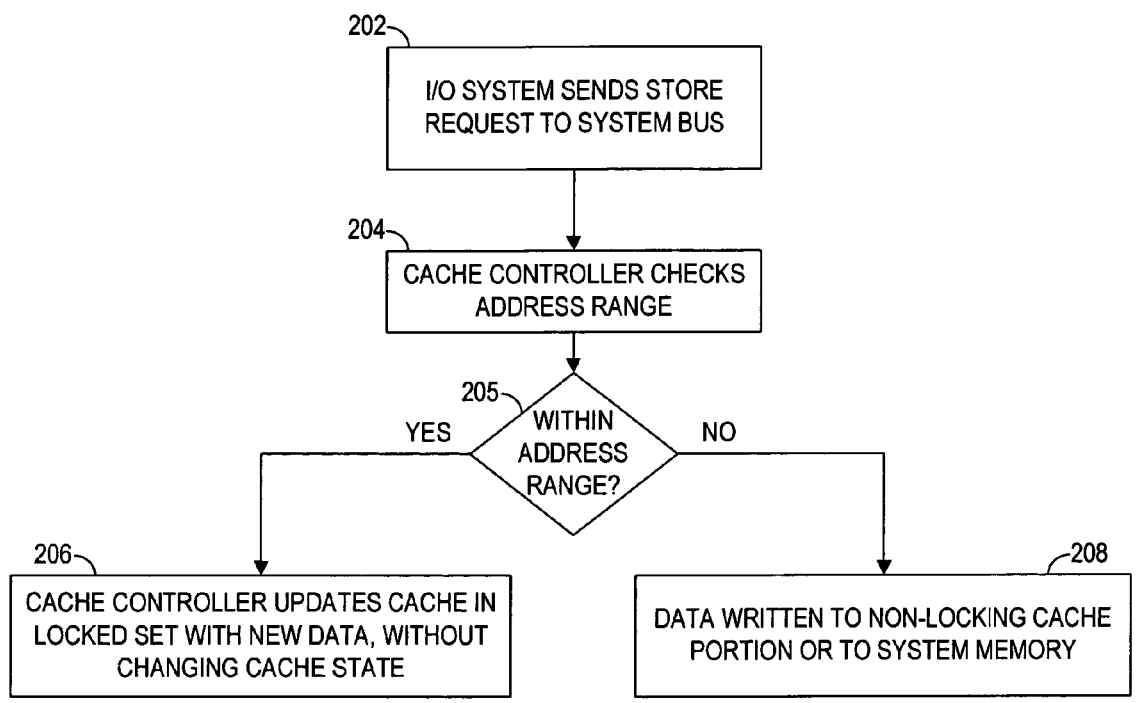
FIG. 2 shows a flow diagram illustrating an I/O subsystem storing data in a locking cache.

FIG. 2 shows a flow diagram illustrating an I/O subsystem 114 storing data in a locking cache. In step 202, the I/O subsystem 114 sends a store request to the system bus 112. In step 204, the cache controller 106 checks the address range of the request, using a pair of address range registers in the address range register set 116. In an embodiment of the invention, the cache controller can also use a masking register. In step 205, it is determined whether the address of the request is within range. If the address is within range for the locking cache, then in step 206, the data is written to the locking cache. If the address is not within range, then in step 208, the data is written to the non-locking portion of the cache or to system memory. In an embodiment of the invention, in step 208 the data is written to system memory. In another embodiment of the invention, in step 208 the data is written both to system memory and to the cache 110, but not to the portion of the cache used for the locking cache. In yet another embodiment of the invention, in step 208 the data is written to the cache 110, but not to the portion used for the locking cache.

Figure 3:
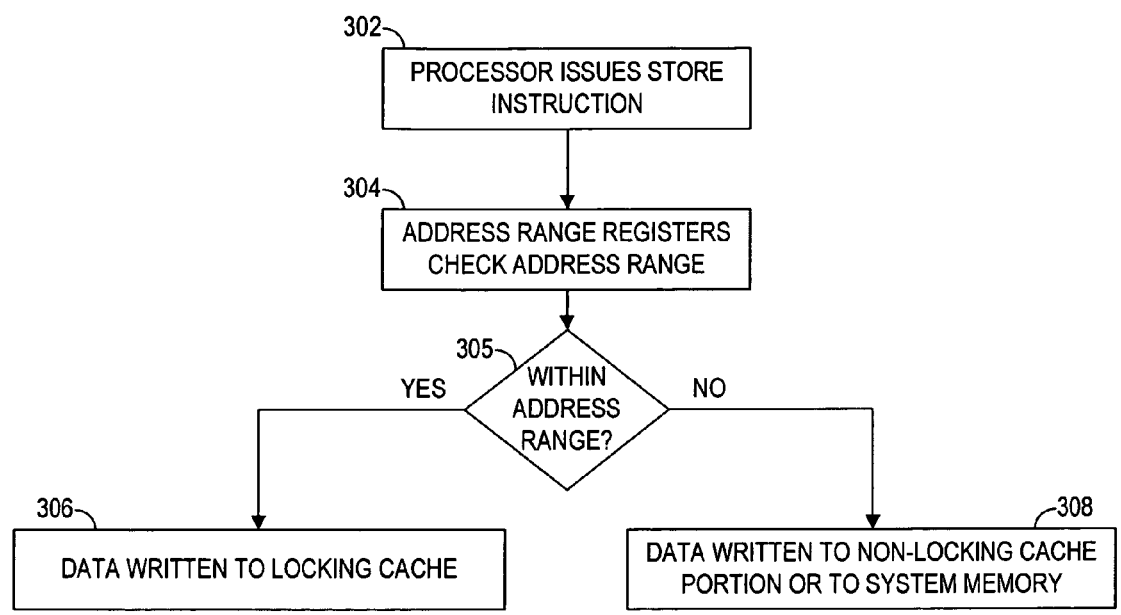
FIG. 3 shows a flow diagram illustrating the address range check when a processor stores data.

FIG. 3 shows a flow diagram illustrating the address range check when a processor stores data. In step 302, the processor 102 issues a store request. In step 304, a pair of address range registers in the address range register set 104 checks the address range of the request. In an embodiment of the invention, the address range register set 104 can also contain a masking register. In step 305, it is determined whether the address of the request is within range. If the address is within range for the locking cache, then in step 306, the data is written to the locking cache. If the address is not within range, then in step 308, the data is written to the non-locking portion of the cache or to system memory. In three different embodiments of the invention, in step 308 the data is written to system memory; to system memory and to the cache 110, but not to the portion of the cache used for the locking cache; and to the cache 110, but not to the portion used for the locking cache, respectively.

Figure 4:
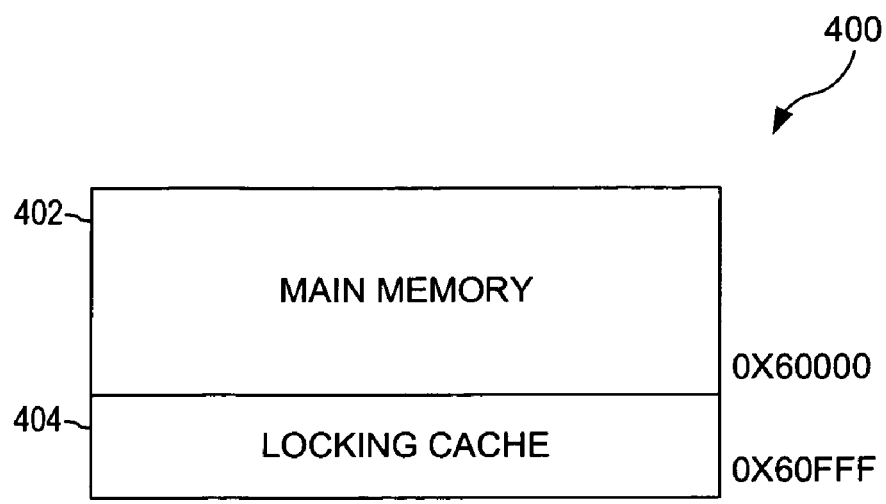
FIG. 4 is a diagram showing the layout of memory from the perspective of an I/O subsystem.

FIG. 4 is a diagram showing the layout of memory from the perspective of an I/O subsystem. The locking cache seems to be additional system memory with an address range above that of the main system memory. In FIG. 4, main memory ends with address 0X60000 (hex), and the locking cache contains addresses 0X60001 (hex) through 0X60FFF (hex). The locking cache illustrated in FIG. 4 contains 4 kb. The size of the locking cache is implementation dependent. Although the main memory and locking cache address spaces are consecutive in FIG. 4, in other embodiments, the address spaces do not have to be consecutive.

Figure 5:
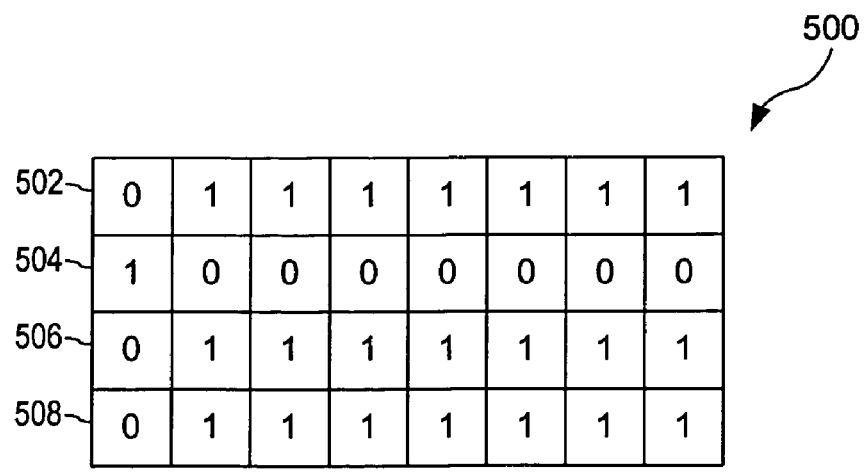
FIG. 5 illustrates a replacement management table.

FIG. 5 illustrates a replacement management table (RMT) 500 having four rows of entries, 502, 504, 506, and 508, each row being indexed by the binary numbers 00, 01, 10, and 11, respectively. The entries in a row of the RMT 500 indicate which sets in a cache are available for a transaction. Columns correspond to the ways or sets of the cache 110. A 1-bit in a column designates that the corresponding way is available to the transaction, and a 0-bit designates that the corresponding way is not available. Transactions involving the locked cache 404 are provided a class_id that gives an index into a row with 1's for the sets comprising the locked cache and 0's for the other sets. Transactions not involving the locked cache are provided a class_id that gives an index into a row with 0's for the sets comprising the locked cache and a 1 for at least one set in the cache not involving the locked cache. The cache corresponding to the RMT in FIG. 5 has eight sets or ways. The first set is used as the locking cache, and the remaining sets are used for regular cache. There are four rows to the RMT. The index 01, corresponding to the second row 504, is used for transactions that access the locking cache. The "1" in the first column of the row 504 indicates that the first set, the one used for the locking cache, is available for the transaction. The "0"s in the remaining columns of the row 504 indicate that the other sets in the cache are not available for the transaction. The other rows 502, 506, and 508 indicate that the set used for the locking cache is not available, but the sets comprising the normal cache are available.

In other embodiments, multiple sets can be used for the locking cache. In those embodiments, software selects the set in which to store particular data. The software could begin writing to the first set of the locking cache. When that set was filled up, the software could begin to write to the second set of the locking cache.

Figure 6:
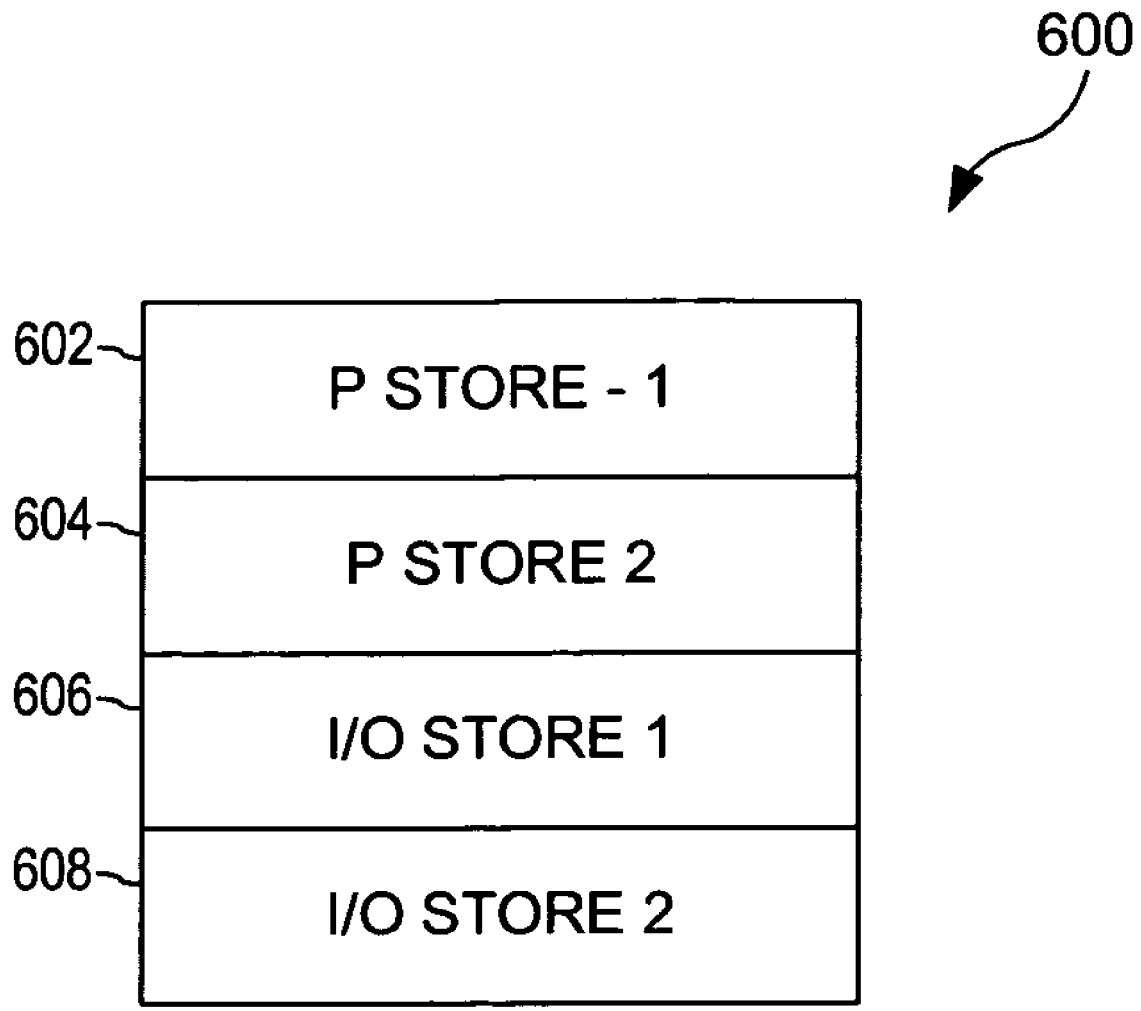
FIG. 6 illustrates a partitioning of the locking cache.

FIG. 6 illustrates a partitioning of the locking cache into four partitions or segments. The processor 102 can store data in the first two segments, and the I/O subsystem 114 can store data in the remaining two segments. As a result, the processor can write data to the second segment 604 while it is waiting for the I/O subsystem 114 to access data that has been written to the first segment 602. Similarly, the I/O subsystem 114 can write data to the third segment 606 while it is waiting for the processor 102 to access data written to the fourth segment 608. Thus, both the processor 102 and the I/O subsystem 114 can avoid the latency of waiting for data to be accessed before storing other data.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. A computer system, comprising:
 a processor;
 a cache connected to the processor, wherein the cache is partitioned into a locking cache and a non-locking cache;
 a cache controller connected to the processor and the cache;
 a system bus connected to the cache;
 an I/O subsystem connected to the system bus;
 one or more address range registers that store a specified address range to access the locking cache such that the locking cache appears as additional system memory;
 wherein the I/O subsystem is configured to issue a store instruction to transfer data to the locking cache without also transferring it to system memory;
 wherein the cache controller is configured to determine whether the store instruction is within the specified address range for the locking cache and store the data in the locking cache if the store instruction is within the specified address range;
 wherein the locking cache is configured to retain the data until the data has been accessed for use; and
 wherein the I/O subsystem is configured to receive a signal, responsive to the data being loaded for use, indicating that the data in the locking cache can be overwritten.

2. The computer system of claim 1, wherein:
 the processor is configured to write data to the locking cache without also writing it to system memory; and
 the locking cache is further configured to retain the data written by the processor in the locking cache until it has been accessed for use by the I/O subsystem.

3. The computer system of claim 1, further comprising a multiple set-associative cache, wherein the cache comprises a plurality of sets or ways and wherein the locking cache comprises one or more sets or ways of the cache, but not all of the sets or ways.

4. The computer system of claim 3, further comprising a replacement management table, wherein the entries in the replacement management table indicate which set or sets in a cache are available for a transaction.

5. A method for the transferring of data from an I/O subsystem of a computer system directly to a locking cache and for the retaining of the data in the locking cache until loaded for use, the method comprising:
 partitioning a cache into a locking cache and a non-locking cache;
 receiving, by a cache controller, a store instruction from the an I/O subsystem;
 determining, by the cache controller, whether the store instruction is within a specified address range to access the locking cache, wherein one or more address range registers store the specified address range such that the locking cache appears as additional system memory;
 configuring the locking cache so that data written to the locking cache will not be overwritten by at least one application running on the processor until the data is loaded for use;
 if the store instruction is within the specified address range, transferring data from the I/O subsystem to the locking cache; and
 responsive to loading the data for use, issuing a signal to a processor of the computing system indicating that the data in the locking cache can be overwritten by the at least one application running on the processor.

6. The method of claim 5, further comprising the step of issuing a signal when data is transferred to the locking cache.

7. The method of claim 5, wherein the processor of the computer system writes data directly to the locking cache, further comprising the steps of:
 writing data by the processor of the computer system to the locking cache; and
 loading the data for use.

8. The method of claim 7, further comprising the steps of:
 partitioning the locking cache;
 assigning one or more but not all of the partitions to the I/O subsystem; and
 assigning one or more of the partitions not assigned to the I/O subsystem to the processor of the computer system;
 wherein data transferred from the I/O subsystem to the locking cache is written only to the partitions of the locking cache assigned to the I/O subsystem and data written by the processor to the locking cache is written only to the partitions of the locking cache assigned to the processor.

9. The method of claim 8, wherein a plurality of partitions are assigned to the I/O subsystem, further comprising the step of:
 transferring data from the I/O subsystem to a second partition after the completion of the I/O subsystem transferring data to a first partition.

10. The method of claim 5, wherein the locking cache comprises one or more sets or ways of a multiple set-associative cache, but not all of the sets or ways.

11. The method of claim 10, wherein a replacement management table is used to indicate which set or sets of the cache is accessible to a transaction.

12. The method of claim 5, wherein the step of configuring the locking cache further comprises marking the data in the locking cache as "valid and modified".

13. The method of claim 12, wherein the step of loading the data for use comprised the steps of:
 issuing a load request without intent to modify;
 snooping the request; and
 intervening to transmit the data from the cache over a system bus.

14. A computer program product comprising a computer readable storage medium having a computer readable program, wherein the computer readable program, when executed on an I/O subsystem, causes the I/O subsystem to:
 issue a store instruction from the I/O subsystem within a computing device, wherein the computing device comprises a cache that is partitioned into a locking cache and a non-locking cache and one or more address range registers that store a specified address range to access the locking cache such that the locking cache appears as additional system memory, wherein the store instruction stores data to an address within the specified address range, and wherein the locking cache is configured so that data written to the locking cache will not be overwritten until the data is loaded for use; and receive a signal indicating that the data in the locking cache can be overwritten responsive to the data being loaded for use.

15. The computer program product of claim 14, wherein the computer readable program, when executed on the I/O subsystem, further causes the I/O subsystem to:

issue a load request without intent to modify for the data.

16. The computer program product of claim 14, wherein the computer readable program, when executed on the I/O subsystem, further causes the I/O subsystem to:

mark the data in the locking cache as "valid and modified".

17. The computer program product of claim 14, wherein the locking cache is partitioned into a first partition and a second partition, and wherein the computer readable program, when executed on the I/O subsystem, further causes the I/O subsystem to:

write data to the second partition after the completion of writing data to the first partition.

* * * * *